UNITED STATES PATENT OFFICE.

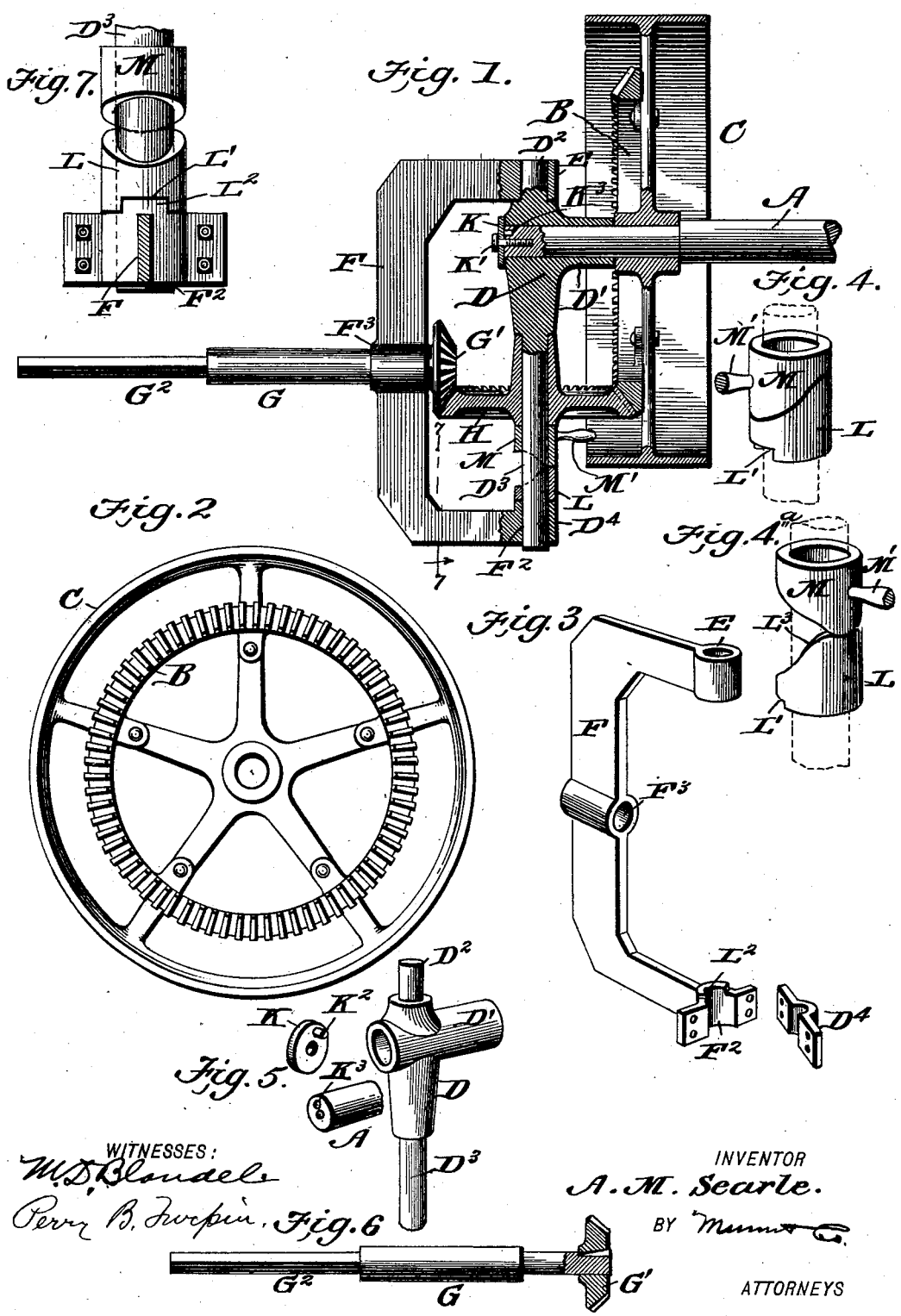

AMBROSE M. SEARLE, OF GENESEO, ILLINOIS.

COGGED GEARING.

SPECIFICATION forming part of Letters Patent No. 678,286, dated July 9, 1901.

Application filed October 6, 1899. Serial No. 732,811. (No model.)

*To all whom it may concern:*

Be it known that I, AMBROSE M. SEARLE, residing at Geneseo, in the county of Henry and State of Illinois, have made certain new and useful Improvements in Cogged Gearing, of which the following is a specification.

My invention is in the nature of an improvement in gearing designed especially for use in traction-engines, and has for an object to provide means for transmitting the power from the main shaft of the traction-engine to the objective work to be done, which means will be simple and stable in construction, may be easily and quickly adjusted and disconnected or thrown out of gear when so desired for traction work or for changing the position of the engine, which will permit the engine to do its work from various positions relative to such work, and will furnish a convenient efficient substitute for the belt now commonly used.

The invention consists in certain novel constructions and combinations of parts, as will be hereinafter described, and pointed out in the claims.

In the drawings, Figure 1 is a sectional side view of my improvement. Fig. 2 is a detail view of the fly-wheel and main gear. Fig. 3 is a detail perspective view of the brace bearing-frame. Figs. 4 and 4$^a$ are detail views of the devices for adjusting the connecting-gear. Fig. 5 is a detail perspective view of the hanging boxing and its securing devices. Fig. 6 is a detail view of the tumbling-rod, and Fig. 7 is a detail section on about line 7 7 of Fig. 1.

As before suggested, my invention relates to the means for transmitting the motion or power from the main shaft A of the traction-engine to the machine which it may be desired to operate by such engine. The main gear B is cast into or is bolted onto the fly-wheel C on the main shaft A of the traction-engine, being of the kind commonly used on traction-engines. The hanging boxing D has the arm D', which rests and runs upon the main shaft A. The shaft and boxing are held together by means of the cap K, secured to the end of the shaft A by means of a central screw K', such cap overlapping the hanging boxing and being secured further to the shaft A by means of a lug K$^2$ on the cap entering a socket K$^3$ in the end of the shaft A.

The hanging boxing is provided above the arm D' with a pivot-stud D$^2$ and below such arm D' with a journal D$^3$, arranged in alinement with the stud D$^2$. The journal D$^3$ receives the cap D$^4$, which is screwed to place upon said journal. The brace bearing-frame F is provided at E with a bearing for the stud D$^2$, and at F$^2$ with an open box to fit the journal D$^3$, as shown. The frame F is also provided at F$^3$ with a bearing for the tumbling-rod G, which latter is provided with a pinion G' and with a non-circular portion G$^2$ for connection with the machine which it is desired to drive. A connecting-gear H is supported on the bearing D$^3$ and is movable longitudinally thereon into and out of position to mesh with the main gear and the pinion of the tumbling-rod. When meshed with said gears, the connecting-gear will transmit the motion from the main shaft to the tumbling-rod, as will be understood from the drawings.

For the purpose of setting the connecting-gears into mesh with the main gear and pinion I provide the adjusting devices, consisting of the tubular cam-bearing L, which fits on the bearing D$^3$ and has a notch at L', receiving a projection L$^2$ on the frame F, so that the tube L will be held from turning. At its upper end the tube L has a cam-surface L$^3$, which is engaged by the lower edge of the adjusting-collar M, which bears beneath the connecting-gear and is provided with a handle M', by which it may be turned to raise or lower the connecting-gear, as may be desired.

It will be noticed that the frame F is pivotally connected with the hanging boxing and is rockable therewith and also independently of the said boxing and in a plane at right angles to the axis of said boxing, as will be understood from the drawings. The tumbling-rod and pinion on tumbling-rod being held in place by the frame and said frame being boxed to pivot-lug and to journal on hanging boxing, second cog-wheel intermeshing with said pinion running on said journal of hanging boxing, and said pivot-lug and said journal being at opposite points and upon a line drawn through their respective centers, a free lateral movement of the tumbling-rod is obtained, the pinion being constantly held upon the second cog-wheel and transmitting the power from said cog-wheel by means of the guidance of the swinging frame. Thus the traction-engine is enabled to perform its work in any position relative to the objective work to be done within an arc of one hundred and eighty degrees described about the engine with the hanging boxing on the main shaft as a center.

Having thus described my invention, what I claim, and desire to secure by Letters Patent, is—

1. The combination substantially as described of the main shaft and gear, the hanging boxing having a bearing therefor and provided with the pivot-stud and with the journal in line with such stud, the connecting-gear on said journal, means for adjusting said connecting-gear and the brace-frame provided with bearings for the hanging boxing and for the tumbler-shaft, and the tumbler-shaft and its pinion substantially as set forth.

2. The combination substantially as herein described of the main shaft and gear, the hanging boxing, the arm thereof provided with a bearing for said shaft, a pivot-stud and a journal extension at right angles to said arm and in alinement with each other, the brace-frame provided with a bearing for the pivot-stud and an open boxing for the journal extension, the connecting-gear, the means for adjusting said gear and the tumbling-rod and its pinion substantially as set forth.

3. The combination of the hanging boxing, the pivot-stud and journal thereof, the gear-wheel on said journal, a brace-frame having bearings for the pivot-stud and for the journal, such brace being arranged to swing in a lateral direction upon the axis of said gear-wheel and having a bearing for the tumbling-rod substantially as set forth.

4. The combination of a hanging boxing and a pivot-stud and an opposite alined journal thereof, the brace-frame having bearings for said stud and journal and provided with a bearing for the tumbling-rod, the tumbling-rod, the pinion thereof, and a gear on the hanging boxing arranged to mesh with the said pinion substantially as set forth.

5. The combination substantially as described of the drive-gear, the tumbling-rod pinion, the connecting-gear movable into and out of mesh with said gear and pinion, and the cam-collar and coöperating devices for setting the connecting-gear into such mesh substantially as set forth.

6. The combination substantially as described of the hanging-boxing journal, a gear movable longitudinally thereon, the collar arranged at one edge to move said gear and having a cam in its opposite edge such collar fitting upon the journal of the hanging boxing, the tube also fitting on said journal and having at one end a cam for engagement by that of the collar and provided at its other edge with a slot, and a frame provided with a lug or projection entering such slot substantially as set forth.

7. The combination of the main shaft, a tumbling-rod for transmitting power from the main shaft, gears on said shaft and rod, connecting-gearing between said shafts, a hanging boxing supporting the connecting-gearing, and a swinging frame supporting the tumbling-rod, substantially as set forth.

8. The combination of the shaft A having socket $K^3$ the hanging boxing thereon, the cap K turning with the shaft and having lug $K^2$ entering the socket $K^3$, and the screw $K'$, substantially as set forth.

AMBROSE M. SEARLE.

Witnesses:
CHAS. G. DAVIS,
H. V. FISHER.